US012557824B2

(12) United States Patent     (10) Patent No.:   US 12,557,824 B2

Puig, II et al.     (45) Date of Patent:   Feb. 24, 2026

(54) SYSTEMS FOR PROVIDING SMOKE FLAVOR TO A FOOD ARTICLE OR BEVERAGE

(71) Applicant: Smoke and Serve Enterprises LLC, Alpharetta, GA (US)

(72) Inventors: Richard G. Puig, II, Alpharetta, GA (US); Christopher J. von Holt, Roswell, GA (US)

(73) Assignee: Smoke and Serve Enterprises LLC, Alpharetta, GA (US)

( * ) Notice: Subject to any disclaimer, the term of this patent is extended or adjusted under 35 U.S.C. 154(b) by 422 days.

(21) Appl. No.: 18/173,577

(22) Filed: Feb. 23, 2023

(65) Prior Publication Data

US 2024/0284924 A1    Aug. 29, 2024

(51) Int. Cl.
   *A23B 4/044*     (2006.01)
   *A23L 27/27*     (2016.01)

(52) U.S. Cl.
   CPC .............. *A23B 4/044* (2013.01); *A23L 27/27* (2016.08)

(58) Field of Classification Search
None
See application file for complete search history.

(56)        References Cited

U.S. PATENT DOCUMENTS

2019/0289865 A1*   9/2019   Hall ........................ A23B 4/00

* cited by examiner

*Primary Examiner* — Jyoti Chawla
(74) *Attorney, Agent, or Firm* — Lee & Hayes, P.C.

(57)         ABSTRACT

A smoker for imparting a smoke flavor profile onto or into a beverage or food is described herein. The smoker includes a smoke channel that receives smoke from a smoke source. The smoker source is connected to the smoke channel to fill up at least a portion of the smoke channel. The smoke travels through the smoke channel into one or more infusion ports. A container is placed in contact with a surface of the smoker receives the smoke. A food or beverage can be added to the container for infusing the smoke into the food or beverage.

18 Claims, 6 Drawing Sheets

SYSTEMS FOR PROVIDING SMOKE FLAVOR TO A FOOD ARTICLE OR BEVERAGE

BACKGROUND

Smoke has been traditionally used to preserve foods such as fish, meat, and other foods. Recently, however, smoke is more often used to impart (or infuse) flavor to foods or beverages, adding a complexity to the flavor and/or aroma of a beverage or food. When adding smoke to a beverage glass (such as a cocktail glass), the smoke contacts the materials (the glass and the contents), thereby imparting the smell and taste of the smoke to the eventual cocktail or food. Conventional smokers often include a glass dome or other enclosed structure into which the beverage or food is placed. The structure is closed, and the smoke is introduced. Some smokers have the smoke already in the dome, ready to receive the food or beverage. The food or beverage is introduced into the structure and the structure is thereafter closed, with a part of the smoke being lost during the introduction of the food or beverage.

Conventional smokers involve the active burning of some form or wood or other material to produce the smoke. For example, one type of smoker is a wood plank that lit on fire with a lighter and a glass cover is placed over the burning plank and the food or beverage to be infused. Other conventional smokers use burning material and some form of enclosure in a similar manner. However, these types of conventional smokers can be disadvantageous in some uses. In commercial uses whereby the smoker may be placed in the proximity of a customer, there can be safety issues with having a burning material in close proximity to those customers. Additionally, conventional smokers often require the smoke to be generated at the place from which the beverage or food is to be consumed, such as a restaurant table, because moving the smoker may cause some of the smoke to be released or it may be too dangerous to allow a person to walk with a burning material in a potentially crowded location.

Examples of the present disclosure are directed to overcoming deficiencies of such systems.

DETAILED DESCRIPTION

Wherever possible, the same reference numbers will be used throughout the drawings to refer to same or like parts.

The disclosure herein is directed to systems for providing a smoke to a beverage or food (hereinafter collectively described as "the target"). Examples of the presently disclosed subject matter use a smoke collection and disbursement channel installed within or onto a serving tray. The channel is designed to receive a portion of smoke from a smoke source and store the smoke for travel to a second location and/or allow for the dispersion of the smoke onto or into the target at a second location. Additional examples allow for the dispersion of the smoke onto or into more than one targets at the same time. These and other examples are described in more detail in the following figures.

Figure 1:
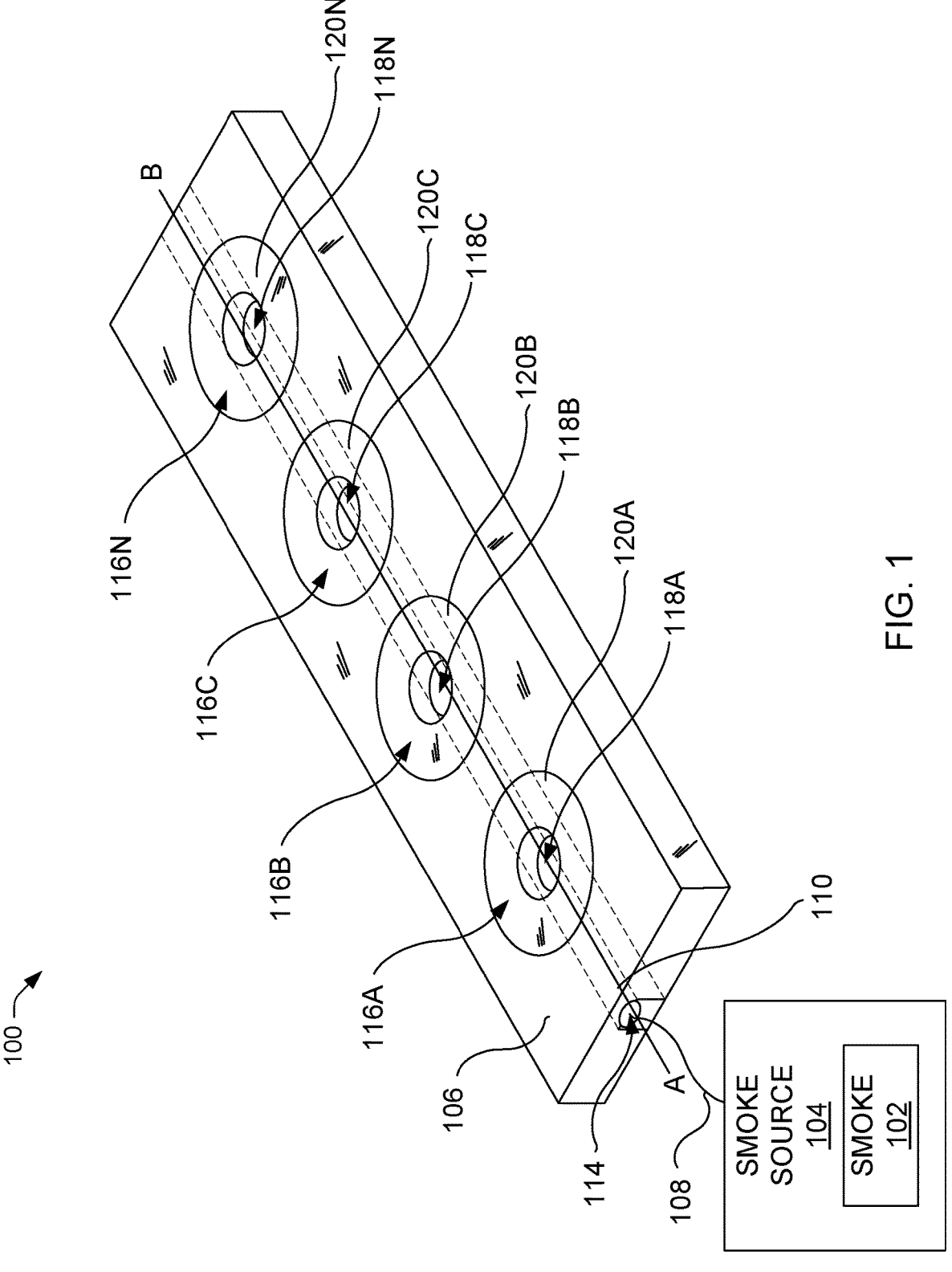
FIG. 1 is an illustration of a smoke system that provides smoke from a smoke source, in accordance with one or more examples of the present disclosure.

Referring now to FIG. 1, there is shown a smoke system 100 that provides smoke 102 from a smoke source 104, in accordance with one or more examples of the present disclosure. The smoke source 104 can be various types of equipment, including a container into which a combustible material, such as wood and/or other materials designed to create a flavor or scent profile, is placed and combusted. It should be noted that the smoke source 104 is merely an example of the fluid that may be introduced into a food or beverage using the smoke system 100. In other examples, the smoke source 104 may be used to introduce a fluid such as nitrogen in liquid and/or gaseous form to be used to reduce to the temperature of one or more components of a food or beverage. The liquid nitrogen may be poured or otherwise directed into the smoke system 100 in a manner similar to the smoke 102 described hereinbelow. The description herein in which the smoke 102 is described is merely for purposes of illustration and not for reducing the scope of the presently disclosed subject matter.

The smoke source 104 is connected to a smoker 106 through tube 108. The tube 108 fluidically connects the smoke source 104 to the smoker 106, permitting the flow of the smoke 102 into the smoker 106 through the tube 108. It should be noted that the smoke 102 may be introduced without a tube 108, as the smoke source 104 can be a canister or other apparatus that connects directly to the smoker 106.

The smoker 106 is the delivery platform that allows the smoke 102 to be infused or cover the target (not pictured). The smoke 102 enters a smoke channel 110 through inlet 114. The smoke channel 110 is has an inner volume defined by the inner surface of the smoker 106. The smoke channel 110 extends from the inlet 114 along axis AB of the smoker 106. The smoke channel 110 receives the smoke 102 through the inlet 114 and into infusion ports 116A through 116N (hereinafter referred to individually as "the infusion port 116A," "the infusion port 116B," and the like, and collectively as "the infusion ports 116"). The infusion ports 116 are designed to allow a container (such as a cocktail glass) to be placed in contact with the smoker 106 for the infusion of the smoke 102 into or onto the target. The infusion ports 116A-116N include infusion channels 118A-118N, respectively (hereinafter referred to individually as "the infusion channel 118A," "the infusion channel 118B," and the like, and collectively as "the infusion channels 118").

The infusion channels 118 are in fluidic communication with the smoke channel 110, whereby the smoke 102 from the smoke source 104 can be received into the container of the target from the smoke source 104, through the smoke channel 110, and into and through the infusion channels 118 into the container. The infusion ports 116A-116N further include container surfaces 120A-120N, respectively (hereinafter referred to individually as "the container surface 120A," "the container surface 120B," and the like, and collectively as "the container surfaces 120"). The container surfaces 120 provide a location onto which the container holding the target is placed, described in more detail in FIG. 2, below.

Figure 2:
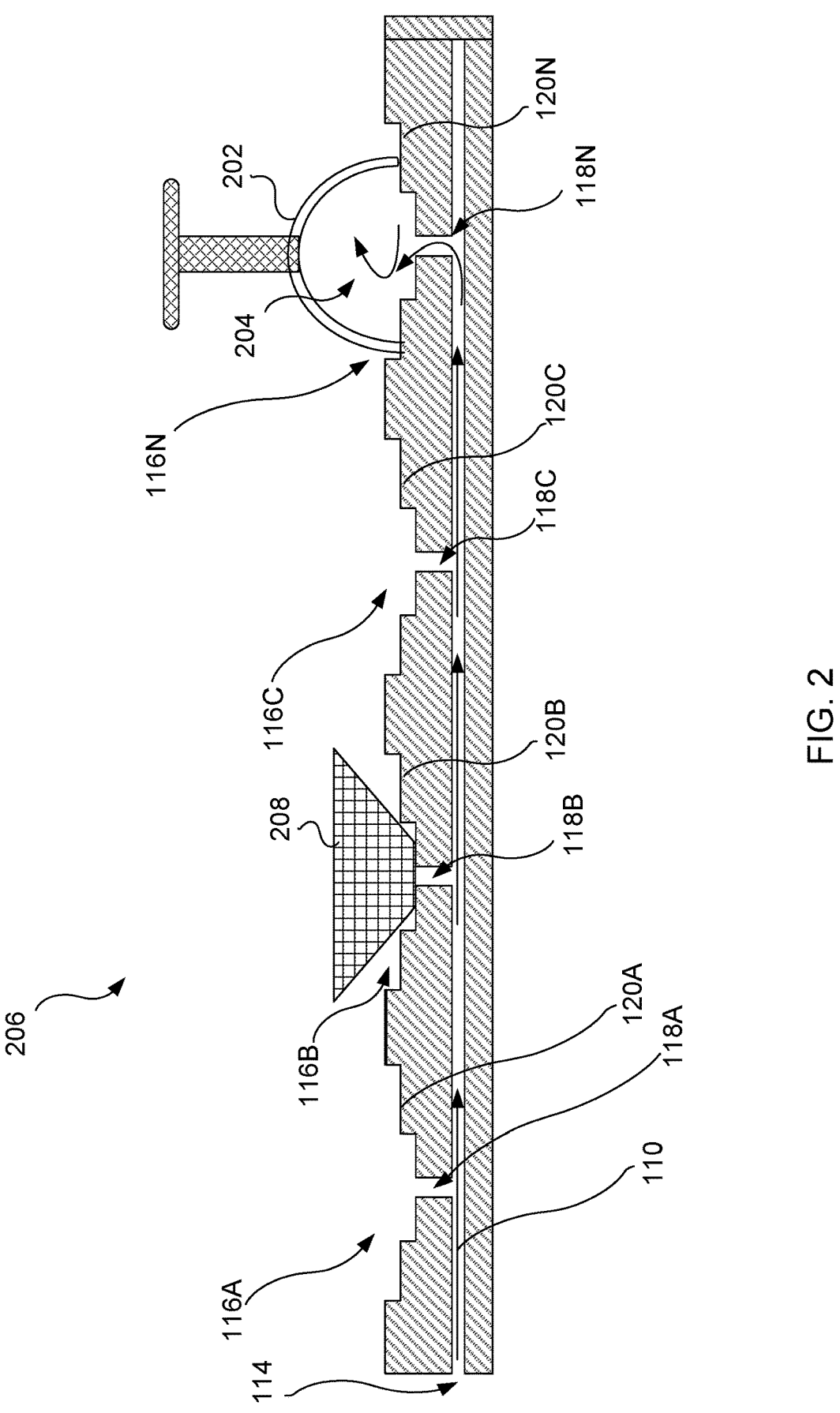
FIG. 2 is a cross-sectional illustration of a smoker, in accordance with one or more examples of the present disclosure.

FIG. 2 is a cross-sectional view of the smoker 106 of FIG. 1, in accordance with one or more examples of the present disclosure. As noted above with respect to FIG. 1, the smoker 106 includes the smoke channel 110, the infusion ports 116, the infusion channels 118, and the container surfaces 120. Smoke 102 from the smoke source 104 enters the smoke channel 110 and travels through the smoke channel 110 through the infusion channels 118 and into a container, such as the container 202 that is placed on the container surface 120N. During use, the container 202 is placed on the container surface 120N. The smoke 102 is introduced into the smoke channel 110 through the inlet 114. The smoke 102 travels to the infusion channel 118N of the infusion port 116N. The smoke 102 moves into and through the infusion channel 118N and into an inner space 204 of the container 202. The smoke 102 collects within the inner space 204 of the container 202. A person (not shown) desiring to impart or infuse smoke onto or into a target (not shown) would thereafter turn the container 202 to a configuration into which the target can be placed within at least a portion of the inner space 204. In some examples, if the smoker 106 is placed so that the infusion channels 118 are directed inline with gravity, the container 202 can have the target in the inner void 204 while the smoke 102 is moving through the infusion channel 118N.

In FIG. 2, it is illustrated that not all of the infusion channels 118 have a container, such as the container 202, engaged or placed on a particular one of the infusion ports 116. Thus, in these examples, it may be desirable to fluidically disconnect the unused infusion ports 116 from an environment 206 around the smoker 106, essentially closing off the unused infusion channels 118. In some examples, a smoke stopper, such as a cork 208, can be used to close off one or more of the infusion ports 116. The cork 208 can be placed within the infusion channel 118B to fluidically disconnect the infusion channel 118B from the smoke channel 110, preventing the flow of the smoke 102 through the infusion channel 118 and into the environment 206, thereby reducing or eliminating the loss of the smoke 102 through an unused one of the infusion channels 118. It should be noted that the presently disclosed subject matter is not limited to the use of the cork 208 as a smoke stopper to fluidically disconnect unused infusion channels 118 from the environment 206. Other technologies of smoke stoppers may be used and are considered to be within the scope of the presently disclosed subject matter.

As noted above, the smoke channel 110 has an inner space that is configured to fluidically connect the smoke 102 with a container, such as the container 202. The smoke channel 110 can be an integral part of the smoker 106 or may be installed onto the smoker 106. For example, the smoke channel 110 may be created by removing material from the smoker 106, whereby the removal of the material creates the inner void that acts as the smoke channel 110. In another example, the smoke channel 110 may be a preformed device that is installed onto the smoker 106, an example of which is shown by way of example in FIG. 3, below.

Figure 3:
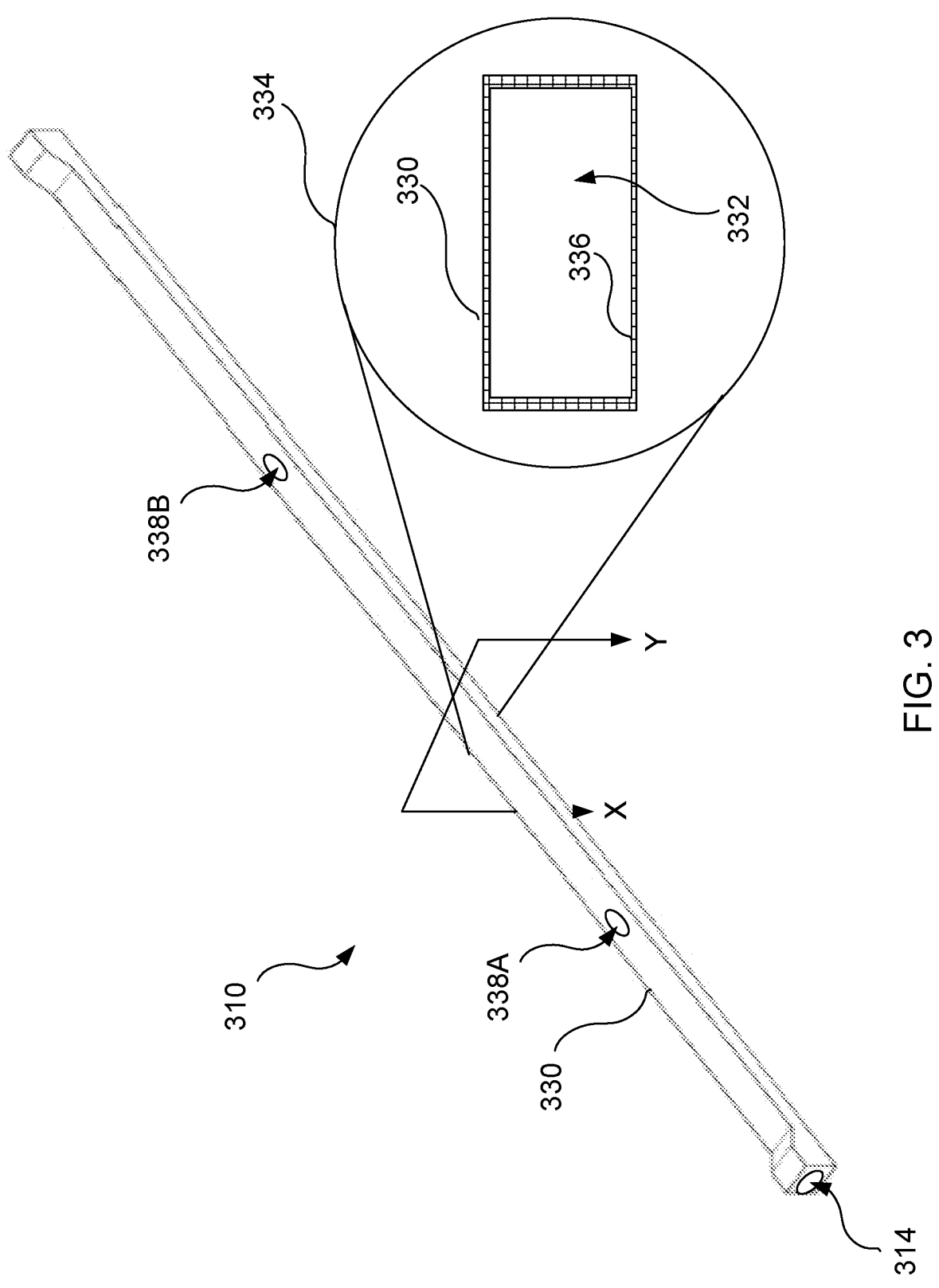
FIG. 3 is an illustration of a smoke channel that is designed to be installed onto a smoker, in accordance with one or more examples of the present disclosure.

FIG. 3 is an illustration of a smoke channel 310 that is designed to be installed onto a smoker, such as the smoker 106 of FIG. 1, in accordance with one or more examples of the present disclosure. The smoke channel 310 includes an inlet 314 that receives smoke from a smoke source, such as the smoke 102 from the smoke source 104 of FIG. 1. The smoke channel 310 includes an outer surface 330 that forms an inner space 332 through which the smoke travels, shown by way of example in a cross-sectional view 334. In the cross-sectional view 334, taken along cut lines XY. The inner space 332 is defined by an inner surface 336 of the smoke channel 310. The smoke channel 310 further includes outlet ports 338A and 338B. The outlet ports 338A and 338B allow for the smoke that is received from the inlet 314 to be delivered (or in fluidic communication) with an infusion channel, such as the infusion channels 118 of FIG. 1, shown by way of example in FIG. 4, below.

Figure 4:
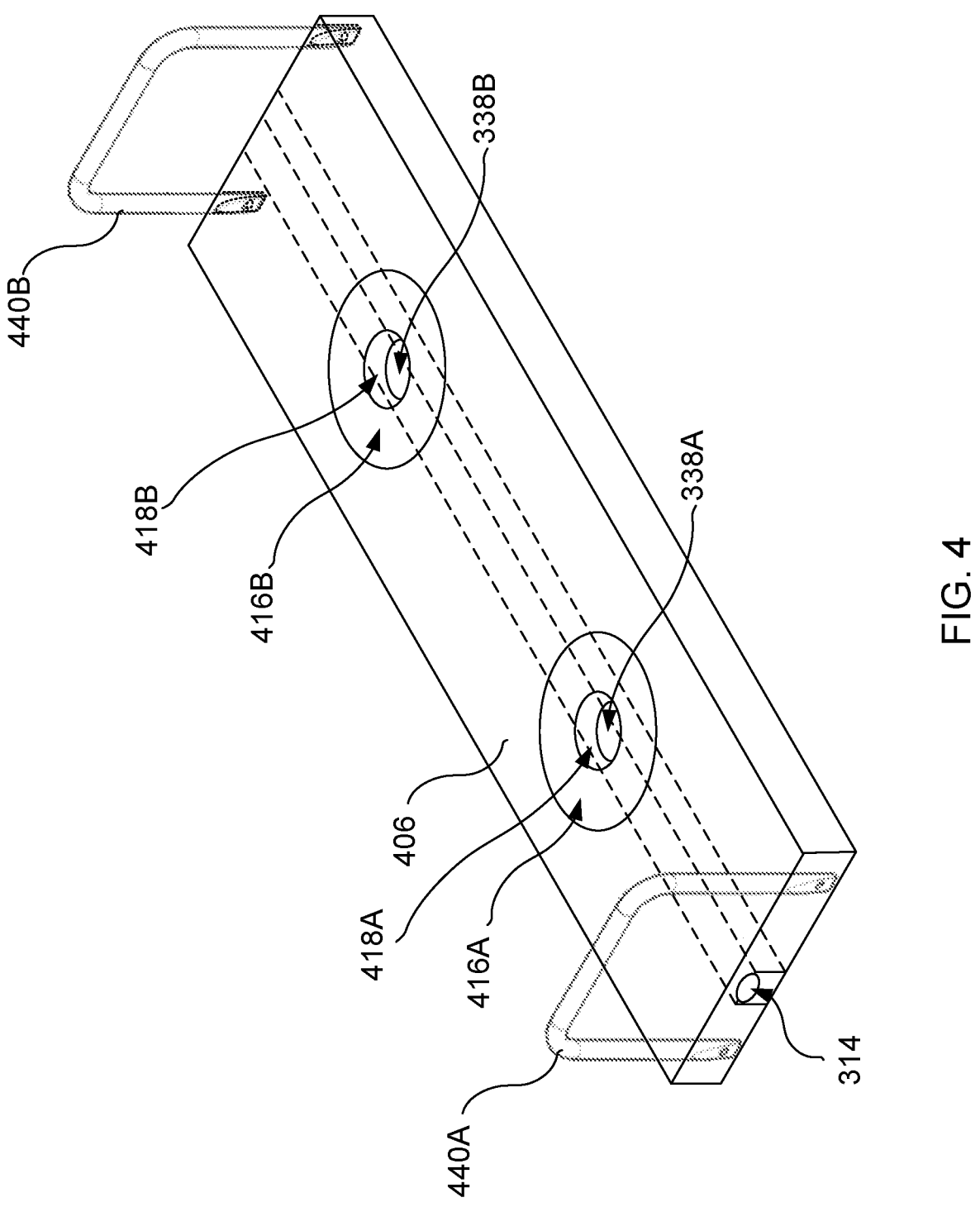
FIG. 4 is an illustration showing a smoke channel installed onto a smoker, in accordance with one or more examples of the present disclosure.
Figure 5:
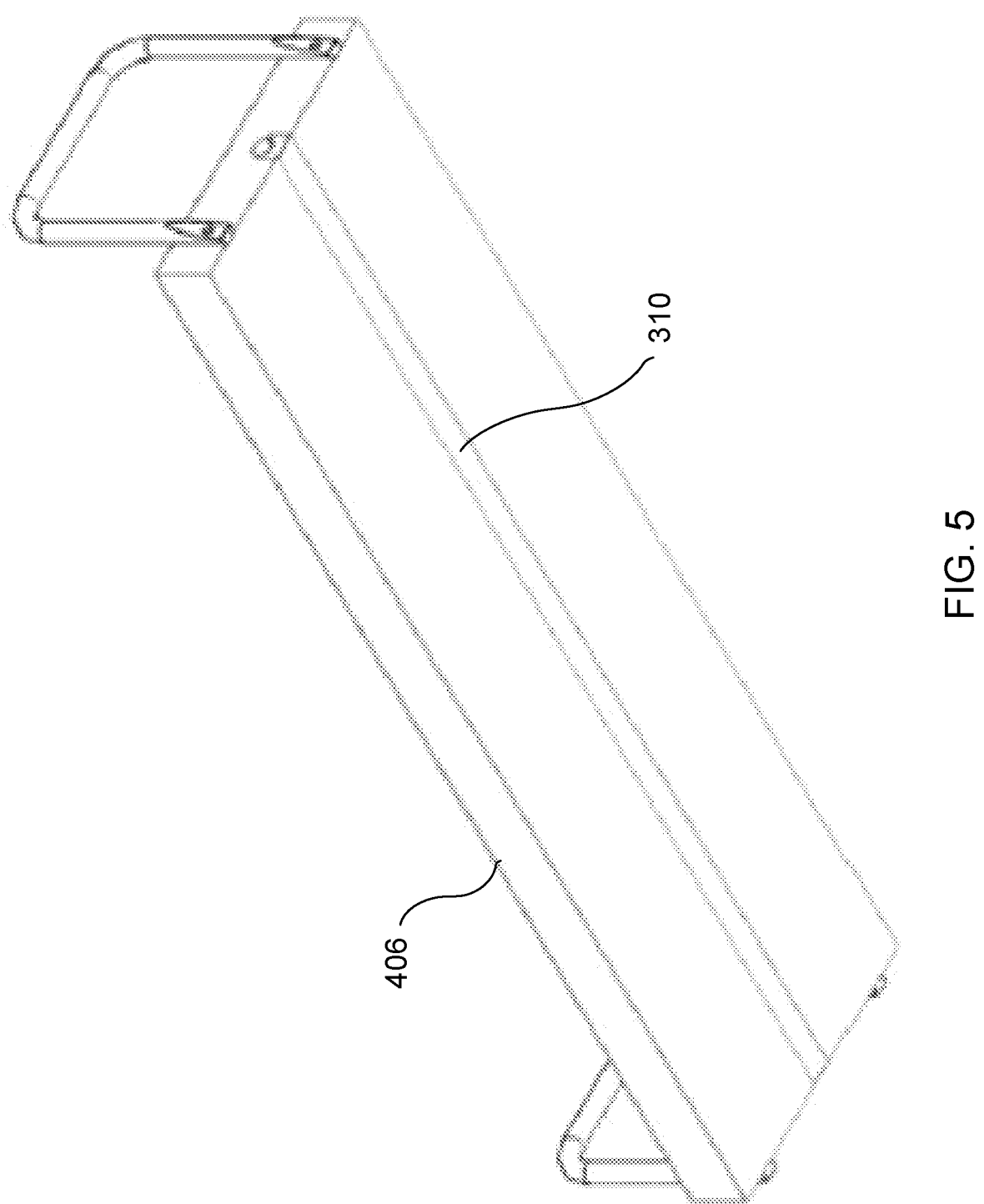
FIG. 5 is a bottom-side illustration showing a smoke channel installed onto a smoker, in accordance with one or more examples of the present disclosure

FIG. 4 is an illustration showing the smoke channel 310 of FIG. 3 installed onto a smoker 406, in accordance with one or more examples of the present disclosure. The smoker 406 includes infusion ports 416A and 416B. It should be noted that the presently disclosed subject matter is not limited to the number of infusion ports described herein, as various examples of the presently disclosed subject matter may have more than one infusion port or more than four infusion ports. The infusion ports 416A and 416B include infusion channels 418A and 418B, respectively. As illustrated, the smoke channel 310 is installed onto the smoker 406 so that the outlet ports 338A and 338B are in fluidic communication with the infusion channels 418A and 418B. This allows smoke entering through the inlet 314 to travel through the inner space 332, out through the outlet ports 338A and/or 338B, through the infusion channels 418A and/or 418B, and into a container. To provide for the handling or transport of the smoker 406, handles 440A and 440B are provided. FIG. 5 is a bottom-side illustration showing the smoke channel 310 installed onto the smoker 406, in accordance with one or more examples of the present disclosure.

Figure 6:
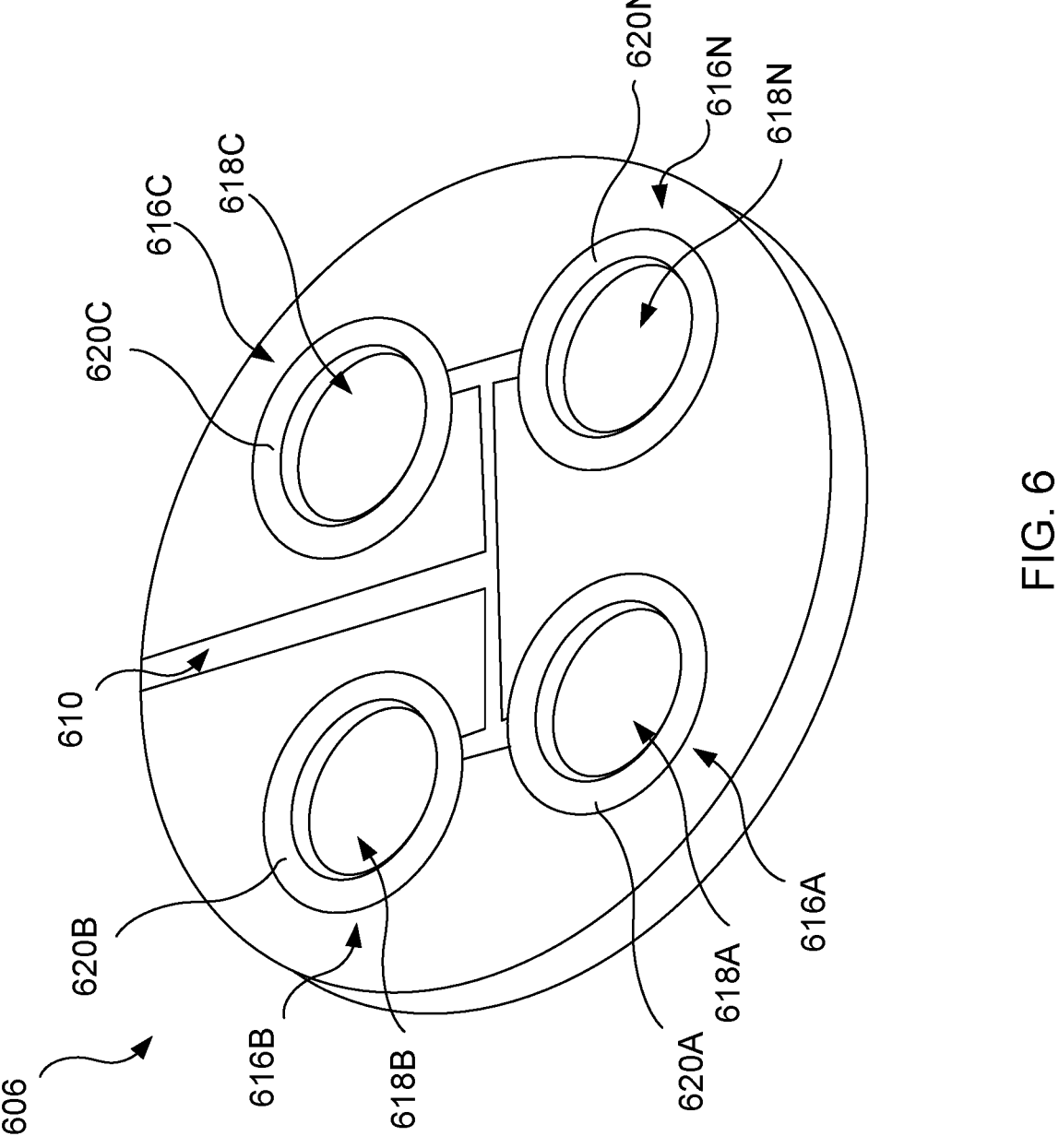
FIG. 6 is an illustration showing an alternate example of a smoker, in accordance with one or more examples of the present disclosure.

FIG. 6 is an illustration showing an alternate example of a smoker 606, in accordance with one or more examples of the present disclosure. The smoker 606 illustrated in FIG. 6 is a rounded design rather than the examples illustrated above, such as the smoker 106 of FIG. 1. The smoker includes a smoke channel 610, infusion ports 616A-616N, infusion channels 618A-618N, and container surfaces 620A-620N. Smoke, such as the smoke 102 from the smoke source 104 of FIG. 1, enters the smoke channel 610 and travels through the smoke channel 610 through the infusion channels 618 and into a container, such as the container 202 of FIG. 2.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A smoker for infusing a smoke flavor onto a food or beverage at a table, the smoker comprising:
   a smoke channel comprising:
   an outer surface;

an inner surface;

an inner space defined by the inner surface;

an inlet for receiving smoke from a smoke source; and at least a first infusion port comprising at least a first infusion channel, wherein the first infusion channel is in fluidic communication with the smoke channel, and wherein the smoke moves through the inner space through at least from the first infusion channel, into at least the first infusion port and, thereafter, onto the food or beverage.

2. The smoker of claim 1, wherein the smoke channel is attached to the smoker.

3. The smoker of claim 1, wherein the inner space of the smoke channel is formed by removal of material from at least a portion of the smoker.

4. The smoker of claim 1, wherein the smoke channel further comprises one or more second infusion channels in fluidic communication with one or more second infusion ports.

5. The smoker of claim 1, further comprise at least one handle for moving the smoker.

6. The smoker of claim 1, wherein the smoker is a rectangular shape or a circular shape.

7. The smoker of claim 1, further comprising a smoke stopper for fluidically disconnecting the first infusion channel from the first infusion port.

8. The smoker of claim 7, wherein the smoke stopper is a cork.

9. The smoker of claim 1, further comprising a container surface for receiving a food container or a beverage container.

10. A smoke system for infusing a smoke flavor onto a food or beverage at a table, the smoke system comprising:

a smoke source for providing smoke;

a smoker, comprising a smoke channel, the smoke channel comprising:

an outer surface;

an inner surface;

an inner space defined by the inner surface;

an inlet for receiving smoke from a smoke source, wherein the inlet is in fluidic communication with the smoke source by a tube; and at least a first infusion port comprising at least a first infusion channel, wherein the at least first infusion channel is in fluidic communication with the smoke channel, and wherein the smoke moves through the inner space through at least from the first infusion channel, into the at least the first infusion port and, thereafter, onto the food or beverage.

11. The smoke system of claim 10, wherein the smoke channel is attached to the smoker.

12. The smoke system of claim 10, wherein the inner space of the smoke channel is formed by removal of material from at least a portion of the smoker.

13. The smoke system of claim 10, wherein the smoke channel further comprises one or more second infusion channels in fluidic communication with one or more second infusion ports.

14. The smoke system of claim 10, further comprise at least one handle for moving the smoker.

15. The smoke system of claim 10, wherein the smoker is a rectangular shape or a circular shape.

16. The smoke system of claim 10, further comprising a smoke stopper for fluidically disconnecting the first infusion channel from the first infusion port.

17. The smoke system of claim 16, wherein the smoke stopper is a cork.

18. The smoke system of claim 10, further comprising a container surface for receiving a food container or a beverage container.

* * * * *